(12) United States Patent
Gandhe et al.

(10) Patent No.: US 11,243,940 B1
(45) Date of Patent: Feb. 8, 2022

(54) SYNTHESIZED PREDICATE DRIVEN INDEX SELECTION FOR PARTITIONED TABLE

(71) Applicant: Progress Software Corporation, Bedford, MA (US)

(72) Inventors: Vinod Kumar Gandhe, Telangana (IN); Mohammed Sayeed Akthar, Telangana (IN); Steven Pittman, Arlington, MA (US)

(73) Assignee: PROGRESS SOFTWARE CORPORATION, Bedford, MA (US)

(*) Notice: Subject to any disclaimer, the term of this patent is extended or adjusted under 35 U.S.C. 154(b) by 240 days.

(21) Appl. No.: 16/696,492

(22) Filed: Nov. 26, 2019

Related U.S. Application Data

(63) Continuation of application No. 16/530,090, filed on Aug. 2, 2019, now Pat. No. 10,990,583, which is a continuation of application No. 15/365,254, filed on Nov. 30, 2016, now Pat. No. 10,387,404.

(60) Provisional application No. 62/267,767, filed on Dec. 15, 2015.

(51) Int. Cl.
*G06F 16/23* (2019.01)
*G06F 16/2453* (2019.01)
*G06F 16/2455* (2019.01)

(52) U.S. Cl.
CPC ...... *G06F 16/2365* (2019.01); *G06F 16/2453* (2019.01); *G06F 16/24544* (2019.01); *G06F 16/24554* (2019.01)

(58) Field of Classification Search
CPC .......... G06F 16/2365; G06F 16/24554; G06F 16/2453; G06F 16/24544
See application file for complete search history.

(56) References Cited

U.S. PATENT DOCUMENTS

| | | |
|---|---|---|
| 4,829,427 A | 5/1989 | Green |
| 6,014,656 A | 1/2000 | Hallmark et al. |
| 8,255,387 B2* | 8/2012 | Galindo-Legaria ........................ G06F 16/2452 707/713 |
| 2007/0179941 A1 | 8/2007 | Huang et al. |
| 2008/0120321 A1 | 5/2008 | Liu et al. |
| 2009/0006314 A1 | 1/2009 | Balmin et al. |
| 2009/0063527 A1 | 3/2009 | Corvinelli et al. |
| 2009/0182724 A1* | 7/2009 | Day ................... G06F 16/2453 |
| 2010/0235344 A1 | 9/2010 | Chandrasekar et al. |
| 2010/0281017 A1 | 11/2010 | Hu et al. |
| 2011/0093485 A1 | 4/2011 | Chang et al. |
| 2012/0191698 A1 | 7/2012 | Albrecht et al. |
| 2013/0297587 A1 | 11/2013 | Singh et al. |
| 2016/0371328 A1 | 6/2016 | Li et al. |
| 2016/0350347 A1 | 7/2016 | Das et al. |

* cited by examiner

*Primary Examiner* — Jorge A Casanova
(74) *Attorney, Agent, or Firm* — Patent Law Works

(57) ABSTRACT

A system and method for receiving a query of a partitioned table, the query including a first index predicate associated with a first partition key column; determining that one or more of the query is missing a second index predicate and the first index predicate is unusable for index probing; responsive to determining that one or more of the query is missing the second index predicate and the first index predicate is unusable for index probing, generating one or more synthesized predicates used to process the query using an index scan.

20 Claims, 7 Drawing Sheets

| Predicates | Without Synthesizing predicates | With Synthesizing predicates |
|---|---|---|
| CreditHold >= 0 AND Balance = 500 | Index scan with only one predicate | Index scan With 2 predicates. |
| SalesRep = 'BBB' AND Balance = 500 AND Custnum = 120 | Table scan | Index scan with following predicates.<br>CreditHold = <Synth_Value> AND Salesrep = 'BBB' AND Balance = 500 AND Custnum=120 |
| SalesRep <> 'BBB' AND Balance = 500 AND Custnum = 120 | Table scan | Index scan with following predicates.<br>CreditHold = <Synth_Value> AND Salesrep = <Synth_Value> AND Balance=500 AND Custnum=120 |
| CreditHold >= 0 AND Balance = 500 | Index scan with only predicate | Index scan with following predicates.<br>CreditHold = <Synth_Value> AND Salesrep = <Synth_Value> AND Balance = 500 |
| SalesRep <> 'BBB' AND Balance = 500 AND Custnum = 120 | Table scan | Index scan with following predicates.<br>CreditHold = <Synth_Value> AND Salesrep = <Synth_Value> AND Balance=500 AND Custnum=120 |

Figure 7

SYNTHESIZED PREDICATE DRIVEN INDEX SELECTION FOR PARTITIONED TABLE

CROSS-REFERENCE TO RELATED APPLICATIONS

This application is a continuation of and claims priority to U.S. application Ser. No. 16/530,090, filed Aug. 2, 2019, title "Synthesized Predicate Driven Index Selection for Partitioned Table," which is a continuation of and claims priority to U.S. application Ser. No. 15/365,254, filed Nov. 30, 2016, titled "Synthesized Predicate Driven Index Selection for Partitioned Table," which claims priority under 35 U.S.C. § 119, of U.S. Provisional Patent Application No. 62/267,767, filed Dec. 15, 2015 and entitled "Synthesized Predicate Driven Index Selection for Partitioned Table" the entireties of which are hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

FIELD OF INVENTION

The present disclosure relates to accessing data. More specifically, the present disclosure relates to augmenting a predicate in a query so that the index can be used to access the data.

BACKGROUND

The amount of data being stored has been trending upwards and so has the utilization of "Big Data." Large data sets are frequently decomposed into smaller more manageable pieces. For example, large tables are decomposed into smaller pieces, called partitions. Data stored in a partition may be described by partition keys. Partition keys are values that can be found in partition key columns. A partition key column is a column in the partitioned table.

Multiple types of partitioning exist, for example, range partitioning, list partitioning, hash partitioning and composite partitioning. Range partitioning selects a partition by determining if the partitioning key is inside a certain range. The range is defined by a lower bound and an upper bound. Each bound has a partition key. List partitioning selects a partition by determining if the partitioning key matches one entry in a list of values. The values in the list are the partition keys. In hash partitioning, the value of a hash function determines membership in a partition. Composite partitioning for certain combinations of the preceding partitioning schemes, such as LIST-RANGE, HASH-RANGE, LIST-LIST etc.

With the upward trend of data storage and "Big Data" the ability to efficiently query the potentially massive amount of data is important. Index scans and table scans are two methods of accessing data. An index scan uses an index for a table to access the data in that table. An index scan generally has better performance than other data access methods including the table scan. An index can have 1 or more keys. An index scan has increasingly better performance as more of its keys are given values to search for. Each index key is bound to one column in the index's table. An index key can also be called an index component or an index key component. An index can only be searched when some prefix of the index is given search values. The search values define the data to access. A table scan does not use the index of a table to access data. It reads all the rows in a table, starting with the first, and proceeding sequentially until the last row is read. Generally, an Index scan has better performance than a table scan.

A problem with existing data access solutions is that they fail to accommodate certain query scenarios (e.g., no predicate on first prefix component of the index, a range predicate appearing somewhere other than as the last predicate, predicates with certain operators such as NOT EQUAL, NOT IN, NOT LIKE, NOT BETWEEN, etc.) and resort to a less-efficient table scan frequently.

SUMMARY

The present disclosure overcomes one or more of the deficiencies of the prior art at least in part by providing a system and method for generating a synthesized predicate for one or more of a missing predicate and/or for an unusable predicate, which produces more efficient querying (e.g. by enabling a table partition local index scan).

According to one innovative aspect of the subject matter described in this disclosure, a system comprising one or more processors; and a memory storing instructions that, when executed by the one or more processors, cause the system to: receive a query of a partitioned table, the query including a first index predicate associated with a first partition key column; determine that one or more of the query is missing a second index predicate and the first index predicate is unusable for index probing; and responsive to determining that one or more of the query is missing the second index predicate and the first index predicate is unusable for index probing, generate one or more synthesized predicates used to process the query using an index scan instead of defaulting to a table scan.

In general, another innovative aspect of the subject matter described in this disclosure may be embodied in methods that include receiving, using one or more processors, a query of a partitioned table, the query including a first index predicate associated with a first partition key column; determining, using the one or more processors, that one or more of the query is missing a second index predicate and the first index predicate is unusable for index probing; and responsive to determining that one or more of the query is missing the second index predicate and the first index predicate is unusable for index probing, generating, using the one or more processors, one or more synthesized predicates used to process the query using an index scan instead of defaulting to a table scan.

Other aspects include corresponding methods, systems, apparatus, and computer program products for these and other innovative features. These and other implementations may each optionally include one or more of the following features.

For instance, it is determined that the query is missing the second index predicate, and the operations include iterating over the partitions of the partitioned table and setting values for a first synthesized predicate associated with the missing second index predicate, the values used to process the query using the index scan instead of defaulting to the table scan. For instance, the second index predicate is missing when there is no index predicate in the query associated with a second partition key column. For instance, the second index predicate is associated with a second partition key column and the second partition key column is a second or subsequent partition key column in a local index. For instance, the second index predicate is missing when there is no index predicate in the query associated with a second partition key column, and the second index predicate is a leading key to the first index key, which is included in the query. For instance, the operations further include determining that the query is missing a third index predicate associated with a third partition key column; and responsive to determining that the query is missing the third index predicate, generating a synthesized predicate associated with the third index predicate and used to process the query using the index scan instead of defaulting to the table scan.

For instance, it is determined that the first index predicate is unusable, the operations further including iterating over the partition definitions of the partitioned table and setting values for a first synthesized predicate associated with one of the first index predicate, the values used to process the query using the index scan instead of defaulting to the table scan. For instance, the first index predicate is unusable for index probing when the first index predicate includes an operator unusable for index probing without the one or more synthesized predicates, the one or more synthesized predicates including a synthesized predicate for the first index predicate. For instance, the first index predicate is unusable for index probing when the first index predicate is itself usable for index probing, but makes an index predicate subsequent to first index predicate unusable for index probing without the one or more synthesized predicates, the one or more synthesized predicates including a synthesized predicate for the first index predicate. For instance, the first index predicate is unusable for index probing and the first index predicate is one of a leading or middle predicate and associated with a range, thereby making a predicate subsequent to the first index predicate unusable for index probing without the one or more synthesized predicates, the one or more synthesized predicates including a synthesized predicate for the first index predicate. For instance, the query includes a join operation and the query is processed using the index scan for the partitioned table, thereby avoiding use of a nested loop. For instance, the one or more synthesized predicates includes one or more of a first synthesized predicate associated with a list partition key column, wherein the partitioned table is partitioned using a partitioning scheme that includes list partitioning, and a second synthesized predicate for the first index predicate, the first index predicate associated with a range in the query and the first index predicate having a position other than the last predicate of the query.

Other implementations of one or more of these aspects include corresponding systems, apparatus, and computer programs, configured to perform the actions of the methods, encoded on computer storage devices. These and other implementations may each optionally include one or more of the following features.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is a table illustrating example predicates from a query and outcomes with and without synthesized predicates according to one embodiment.

DETAILED DESCRIPTION

Figure 1:
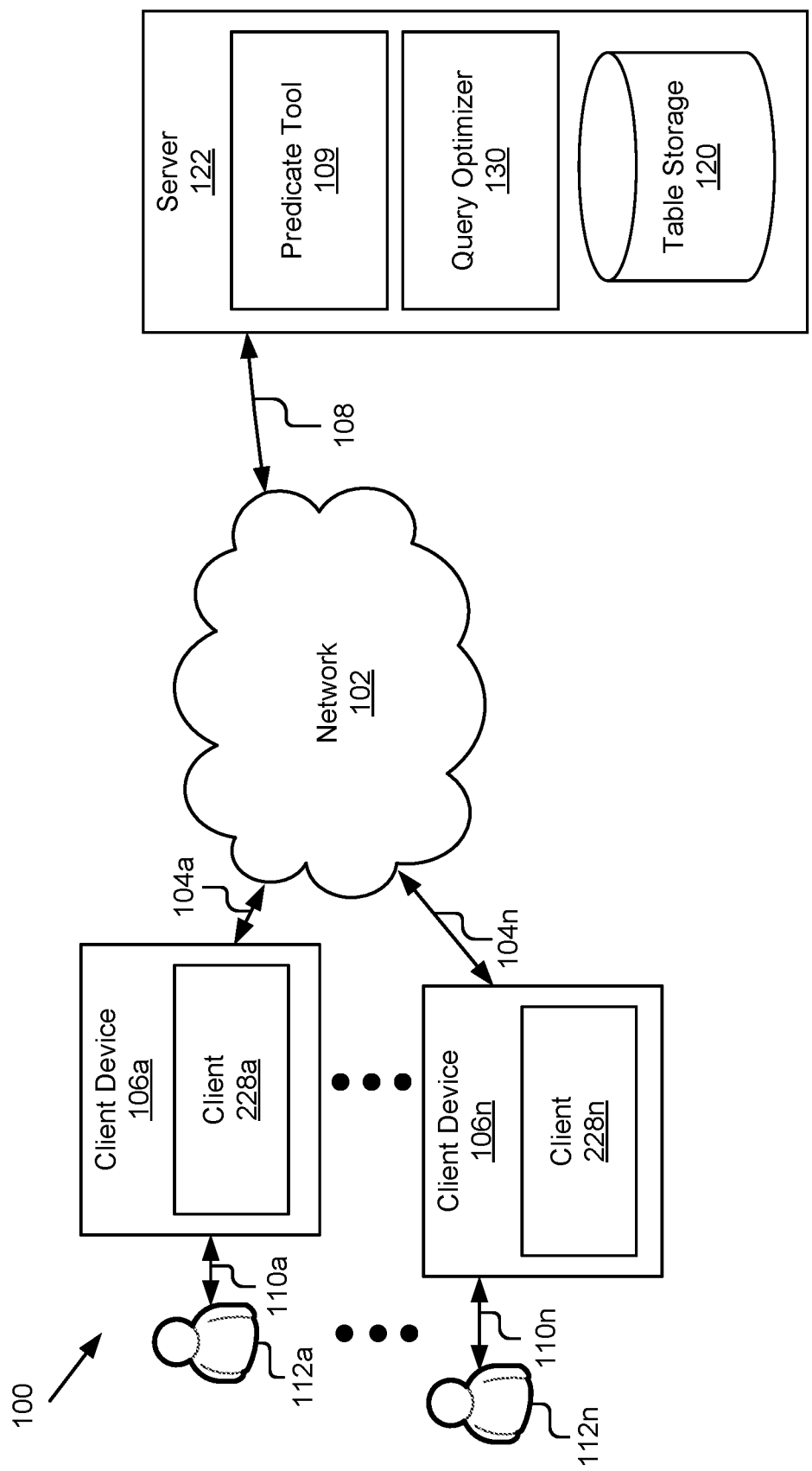
FIG. 1 is a block diagram illustrating an example system for synthesizing a predicate to access data using an index according to one embodiment.

FIG. 1 is a block diagram illustrating an example system 100 for synthesizing a predicate to access data using an index according to one embodiment. The illustrated system 100 includes client devices 106a ... 106n and a server 122, which are communicatively coupled via a network 102 for interaction with one another. For example, the client devices 106a ... 106n (also referred to individually and collectively as 106) may be respectively coupled to the network 102 as illustrated by signal lines 104a ... 104n and may be accessed by users 112a ... 112n (also referred to individually and collectively as user 112) as illustrated by lines 110a ... 110n. The server 122 may be coupled to the network 102 via signal line 108. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation (BSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 228a . . . 228n of a client.

The client 228 described herein generates queries. In one embodiment, the client generates queries based on user 112 input received by the client device 106. Examples of clients 228 include, but are not limited to, internet browsers, e-mail clients, applications, etc.

The server 122 may include one or more computing devices having data processing, storing, and communication capabilities. For example, the server 122 may include one or more hardware servers, server arrays, storage devices, systems, etc., and/or may be centralized or distributed/cloud-based. In some implementations, the server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the server 122 includes an instance of the predicate tool 109 and a query optimizer 130 that uses the synthesized predicate(s) generated by the predicate tool 109 to access data in the table storage 120 using an index.

It should be understood that the system 100 illustrated in FIG. 1 is representative of an example system for synthesizing a predicate to access data using an index according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc. For example, in one embodiment, a client device 106 may include a client 228 for creating queries based on user input, predicate tool 109 local to the client device 106 (not shown) for synthesizing a predicate, a query optimizer 130 local to the client device 106 (not shown) for generating a query plan to query the table storage 120 local to the client device 106 (not shown).

Figure 2:
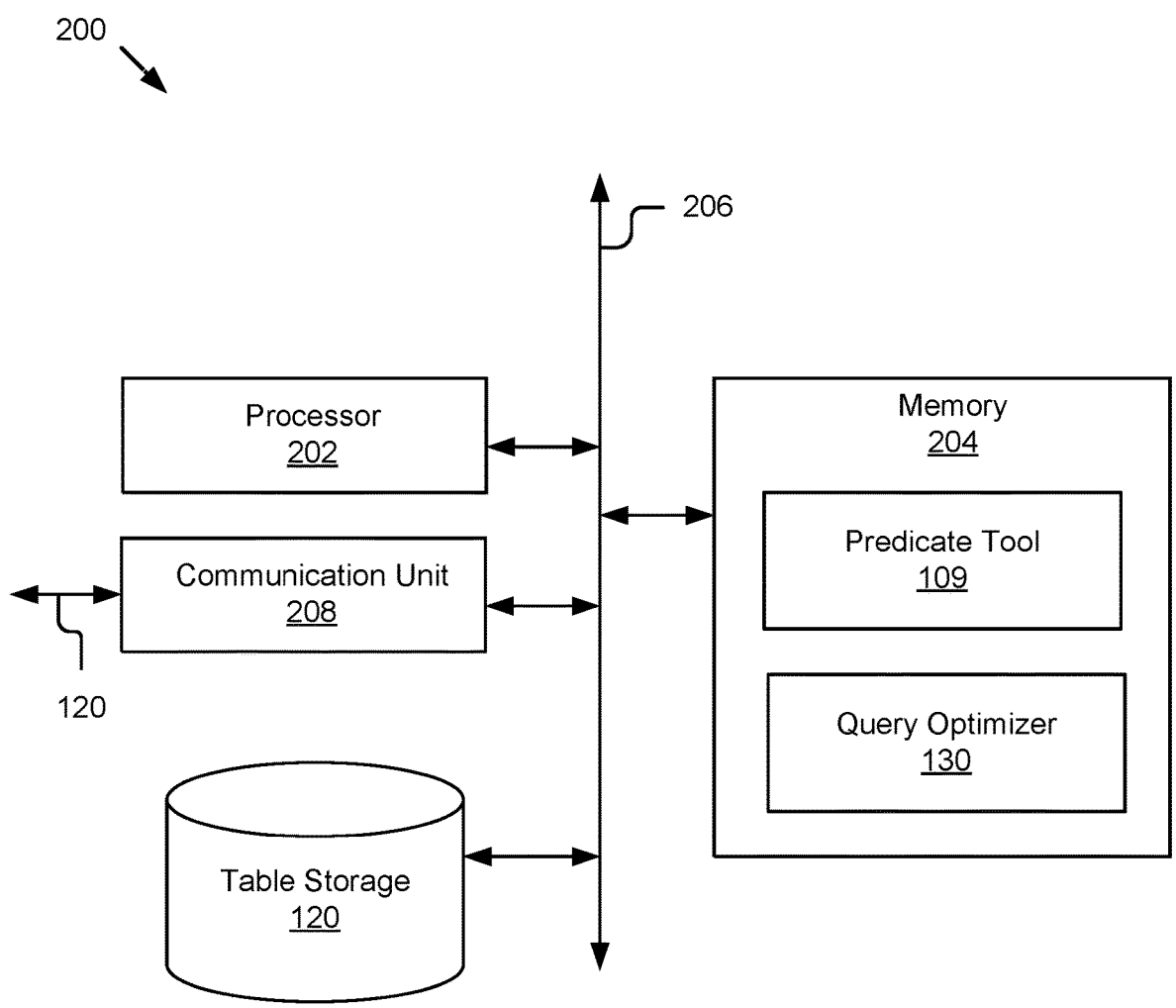
FIG. 2 is a block diagram illustrating an example computing device according to one embodiment.

FIG. 2 is a block diagram of an example computing device 200 according to one embodiment. The computing device 200, as illustrated, may include a processor 202, a memory 204, a table storage 120 and a communication unit 208, which may be communicatively coupled by a communications bus 206. The computing device 200 depicted in FIG. 2 is provided by way of example and it should be understood that it may take other forms and include additional or fewer components without departing from the scope of the present disclosure. For example, while not shown, the computing device 200 may include input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein may be applied to multiple entities in a system 100, for example, the computing device 200 may be a client device 106 or a server 122 depending on the embodiment. However, the embodiment illustrated in FIG. 2, for consistency with the client-server environment illustrated in FIG. 1, uses reference numbers of the server 122.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be coupled to the memory 204 via the bus 206 to access data and instructions therefrom and store data therein. The bus 206 may couple the processor 202 to the other components of the computing device 200 including, for example, the memory 204 and communication unit 208.

The memory 204 may store and provide access to data to the other components of the computing device 200. In some implementations, the memory 204 may store instructions and/or data that may be executed by the processor 202. For example, in the illustrated embodiment, the memory 204 may store the predicate tool 109. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

In the illustrated embodiment, the memory 204 stores a predicate tool 109 and a query optimizer 130. In one embodiment, the predicate tool 109 generates one or more synthesized predicates, which are used by the query optimizer 130 to generate a query plan for accessing the table storage 120 using an index.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 204 may be a single device or may include multiple types of devices and configurations.

The table storage 120 may include one or more non-transitory computer-readable mediums for storing data. In one embodiment, the table storage 120 stores data as partitioned tables. While the illustrated table storage 120 is illustrated as being included in the computing device 200. In some embodiments, the table storage 120 may not be included in the computing device 200 (e.g. the table storage 120 may be a network accessible storage (NAS)) connected to and accessible via the network 102. In some embodiments, the table storage 120 may be included in a memory or storage device (e.g. a hard disk drive) of the computing or storage device 200 or connected to (e.g. as a Direct Access Storage) a computing device 200. In one embodiment, the table storage 120 includes a database management system (DBMS). For example, the DBMS may be a relational DBMS, for example, a SQL DBMS. In some instances, the DBMS may store data in multi-dimensional tables comprised of rows and columns, and manipulate, i.e., insert, query, update and/or delete, rows of data using programmatic operations. While only one table storage 120 is illustrated, it will be recognized that multiple table storages 120 may exist. For example, in one embodiment, the table storage 120 is a distributed database. For clarity and convenience, SQL is referred to and used in many of the examples herein. However, it will be recognized that SQL is merely one example of a data system that utilizes tables and table partitions and that other examples exist and may be used without departing from the disclosure herein.

The bus 206 can include a communication bus for transferring data between components of a computing device 200 and/or between computing devices (e.g. between one or more of the client devices 106 and the server 122), a network bus system including the network 102 or portions thereof, a processor mesh, a combination thereof, etc. In some implementations, the predicate tool 109, its sub-components and various other software operating on the computing device 200 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 200 may include other and/or fewer components. Examples of other components may include a display, an input device, a sensor, etc. (not shown). In one embodiment, the computing device 200 includes a display. The display may display electronic images and data for presentation to a user 112. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the computing device 200. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Predicate Tool 109

Figure 3A:
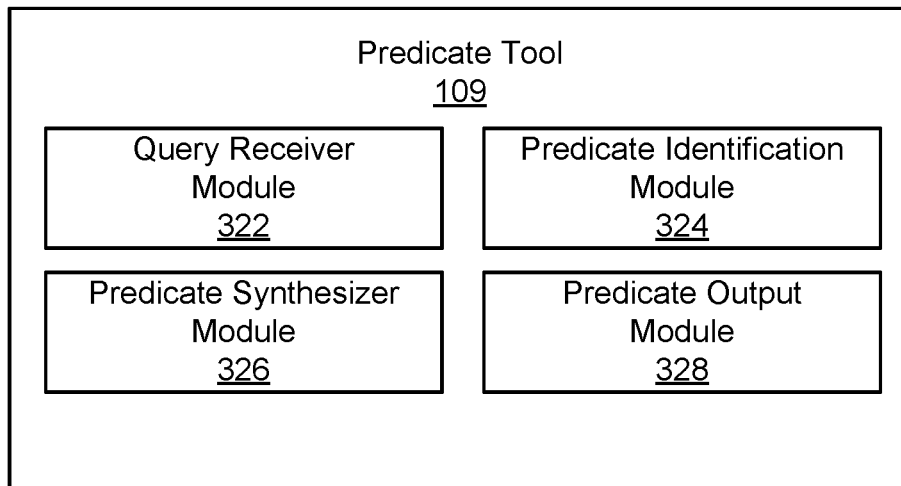
FIG. 3A is a block diagram of a predicate tool according to one embodiment.
Figure 3B:
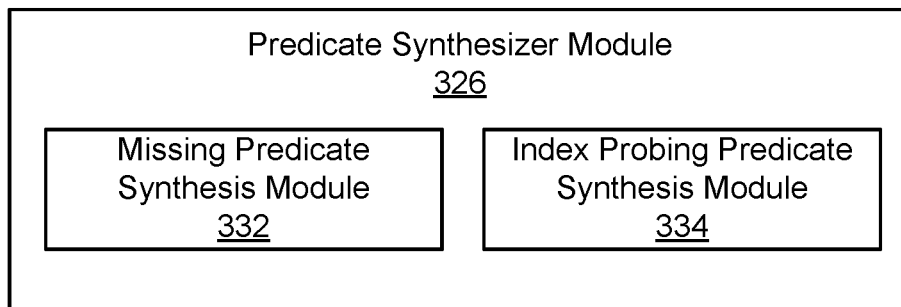
FIG. 3B is a block diagram of a predicate synthesizer module according to one embodiment.

Referring now to FIG. 3A, the predicate tool 109 is shown in more detail according to one embodiment. FIG. 3A is a block diagram of the predicate tool 109 included in a computing device 200 according to one embodiment.

The predicate tool 109 generates one or more synthesized predicates that allow data to be accessed using an index rather than, for example, resorting to a table scan. The general criteria for choosing an index scan, as they exist prior to the disclosure herein, are:

- A query should have predicates a prefix of the index. A prefix of an index is a sequence of one or more of the leading keys of an index, beginning with the first index key.
- Only the last index component of the prefix may have a range predicate.
- Predicates with operators like < >, NOT IN, NOT LIKE, NOT BETWEEN are not eligible (i.e. unusable) for selection of index scan.

The features and benefits of the predicate tool may be more easily be understood and appreciated by considering the following example. Assume the Table "Customer" is partitioned on three columns—"CreditHold," "SalesRep," "Balance"—and the partitioning method for Table "Customer" is LIST-RANGE. Also, assume that the Table "Customer" has a local index "CustIdx1" on columns "CreditHold," "SalesRep," "Balance," and "Custnum." A local index is a partition aligned index. There will be one index object in each partition. A partition aligned index is an index whose leading keys are partition key columns. Now, consider example queries 1-3:

Example Query1:
Select * from Customer where SalesRep='Scott' AND Balance=5000;

Without the predicate tool 109, Example Query 1 is not eligible for choosing INDEX SCAN using CustIdx1, because there is no predicate on the first prefix component of the index (i.e., CreditHold). Because there is no predicate on a prefix of the index, a TABLE SCAN is chosen by a query optimizer without the predicate tool 109 described herein.

Example Query 2:
Select * from Customer where CreditHold >0 and SalesRep < > 'BBB' and Balance=1000 and Custnum=100;

Without the predicate tool 109, an INDEX SCAN is chosen for Example Query 2, where index probing will be based on only the first index component, i.e., CreditHold. Other predicates on SalesRep, Balance and Custnum will be ignored, as first component has a range predicate ("CreditHold >0"), and, as mentioned in the general criteria above, only the last index component may have a range predicate. Therefore, CreditHold becomes the last usable index component without the predicate tool 109 described herein.

Example Query3:
Select * from customer where CreditHold < >0 and SalesRep='Scott' and Balance=1000 and Custnum=100;

Without the predicate tool 109, for Example Query 3, TABLE SCAN is chosen because the predicate on leading index component, which is CreditHold, has an operator < > (NOT EQ) which cannot be used for index probing.

As described above, although there are predicates on some, or all, of the components in the index, most of the above example queries, without the predicate tool 109 described herein, run afoul of one or more of the general criteria for selecting an index scan and do not utilize index scan. With regard to Query 2, while an INDEX SCAN is used, there is a loss of performance since the other predicates on SalesRep, Balance and CustNum are ignored; therefore, index scan and the performance benefits often realized therefrom are not fully realized without the predicate tool described herein.

The predicate tool 109 generates one or more additional predicates, occasionally referred to herein as a "synthesized predicate" or "synthesized predicates" in the plural, or similar, so that the query optimizer 130 (e.g. a SQL Optimizer) may select an index scan for execution and/or may perform a more efficient index scan (e.g. one using a greater number of predicates).

In one embodiment, the predicate tool 109 generates one or more synthesized predicates on one or more LIST partition key columns. In one embodiment, the predicate tool 109 generates one or more synthesized predicates on one or more LIST partition key columns because the rows in a particular partition contain a set of values defined as the LIST partition keys. For clarity and convenience, the following describes the predicate tool 109 generating synthesized predicates on LIST partition key columns in various scenarios.

In one embodiment, the predicate tool 109 comprises a query receiver module 322, a predicate identification module 324, a predicate synthesizer module 326, and a predicate output module 328. It will be recognized that the modules 322, 324, 326, 328 comprised in the predicate tool 109 are not necessarily all on the same computing device 200. In one embodiment, the modules 322, 324, 326, 328 and/or their functionality are distributed across multiple computing devices 200. For example, in one embodiment, the modules 322, 324, 326, 328 are distributed across multiple servers 122.

In one embodiment, one or more of the modules 322, 324, 326, 328, 332, 334 include code and routines. In one embodiment, one or more of the modules 322, 324, 326, 328, 332, 334 include a set of instructions executable by the processor 202. In another embodiment, one or more of the modules 322, 324, 326, 328, 332, 334 are stored in the memory 204 and are accessible and executable by the processor 202. In one embodiment, the one or more modules 322, 324, 326, 328, 332, 334 are adapted for cooperation and communication with the processor 202, other components of the computing device 200 and other components of the predicate tool 109.

The query receiver module 322 receives a query. In one embodiment, the query receiver module 322 receives a query from the client 228. For example, the query receiver module 322 receives a query from a web browser based on user input received at the client device 106.

In one embodiment, the query receiver module 322 passes the received query to the predicate identification module 324. In one embodiment, the query receiver module 322 stores the query in memory 204 (or any other non-transitory storage medium communicatively accessible), and the other modules of the predicate tool 109 may retrieve the query from the memory 204 (or other non-transitory storage medium).

The predicate identification module 324 determines one or more of whether the table being queried is partitioned and one or more predicates of the query. In one embodiment, the predicate identification module 324 determines whether the table being queried has been partitioned. For example, the predicate identification module 324 parses the query to determine the table being queried and determines whether the corresponding table is partitioned in the table storage 120.

In one embodiment, when the predicate identification module 324 determines that the table being queried is not partitioned, the predicate identification module 324 sends the query to the query optimizer to be processed as a query for a regular table and the predicate tool 109 and the components thereof take no further action. In one embodiment, when the predicate identification module 324 determines that the table being queried is partitioned, the predicate identification module 324 determines whether the query includes one or more predicates.

In one embodiment, when the predicate identification module 324 determines that the query does not include predicates, the predicate identification module 324 sends the query to the query optimizer to be processed and the predicate tool 109 and the components thereof take no further action. In one embodiment, when the predicate identification module 324 determines that the query includes predicates, the predicate identification module 324 identifies the predicates in the query and obtains index metadata. In one embodiment, the index metadata includes the columns of the local index. In one embodiment, the predicate identification module 324 identifies whether a predicate is missing from the query, a predicate in the query is unusable for index probing, or both. It should be recognized that, as used herein, "unusable" refers to an inability of systems and methods without a synthesized predicate(s) as described herein.

In one embodiment, the predicate identification module 324 determines that a predicate is unusable for index probing when that predicate is a leading or middle predicate and is associated with a range (which may make subsequent, or following predicates unusable even if the predicate itself is usable) or whether that predicate is associated with an operator that is unusable for index probing (which makes that predicate unusable for index probing). For example, in the query Select * from Customer where CreditHold < > 0 and SalesRep='BBB' and Balance=1000 and Custnum=100; the predicate identification module 324 determines that CreditHold has an operator < > (NOT EQ) which is unusable for index probing. In another example, in the query Select * from Customer where CreditHold >0 and SalesRep < > 'BBB' and Balance=1000 and Custnum=100; the predicate identification module 324 determines that CreditHold as the first predicate component has a range predicate (">").

In one embodiment, the predicate identification module 324 determines whether a predicate is missing. In one embodiment, the predicate identification module 324 uses the obtained index metadata and identified predicates to determine whether a predicate is missing.

In one embodiment, a predicate is missing when there is no predicate using that partition key column in the set of predicates in the query. For example, in Example Query 1 (i.e. Select * from Customer where SalesRep='Scott' AND Balance=5000;), predicates for "CreditHold" and "Custnum" are missing, since the Table "Customer" has a local index "CustIdx1" on columns "CreditHold," "SalesRep," "Balance," and "Custnum."

In another embodiment, a predicate is missing if that predicate is a leading key of an index where a predicate for a following key is present. For example, in Example Query 1 above, the local index is on columns (CreditHold, SalesRep, Balance, Custnum), so "CreditHold," is a leading key for "SalesRep," "Balance," and "Custnum." A "SalesRep" predicate is a following predicate for "CreditHold" and "SalesRep" is a leading key for "Balance." Example Query 1 (i.e. Select * from Customer where SalesRep='Scott' AND Balance=5000;) is missing a predicate for a lead key (i.e. "CreditHold" predicate is missing) but includes predicates for one or more keys that follow the lead key—"CreditHold" (i.e. "SalesRep" and "Balance"). Therefore, "CreditHold" is a missing predicate for Example Query 1.

It should be recognized that, prior to the disclosure herein, when a predicate was missing, that predicate and subsequent, or following, predicates were not used, which is less than ideal. It should also be recognized that, prior to the disclosure herein, when a predicate was associated with a range subsequent, or following, predicates were not used, which is less than ideal. It should also be recognized that, prior to the disclosure herein, when a predicate was associated with an operator unusable for index probing that predicate was not used and subsequent, or following predicates were not used, which is less than ideal. The disclosure herein may allow for an index scan to be performed when a table scan would have otherwise occurred or an index scan to utilize a greater number of predicates than it would have otherwise used. In one embodiment, such benefits are used by generating one or more synthesized predicates.

In one embodiment, the predicate identification module 324 passes predicate information to the predicate synthesizer module 326. In one embodiment, the predicate identification module 324 stores the predicate information in memory 204 (or any other non-transitory storage medium communicatively accessible), and the other modules of the predicate tool 109 may retrieve the query from the memory 204 (or other non-transitory storage medium).

Predicate information is information used by the predicate synthesizer module 326 to generate one or more synthesized predicates. The predicate information may vary based on one or more of the embodiment and the identification(s) and/or determination(s) made by predicate identification module 324. For example, when the predicate identification module 324 determines a predicate is missing, the predicate information includes an identification of the missing predicate. In another example, when the predication identification module 324 determines a predicate is unusable for index probing, the predicate information includes an identification of the unusable predicate.

The predicate synthesizer module 326 generates one or more synthesized predicates for use such that an index scan can be performed when an index scan would otherwise not have occurred and/or an index scan can use more predicates than the index scan would have otherwise utilized. In one embodiment, the predicate synthesizer module 326 generates one or more synthesized predicates on LIST partition key columns for use such that an index scan can be performed when an index scan would otherwise not have occurred and/or an index scan can use more predicates than the index scan would have otherwise utilized In one embodiment, the predicate synthesizer module 326 comprises a missing predicate synthesis module 332 and an index probing predicate synthesis module 334. It will be recognized that the modules 332 and 334 comprised in the predicate synthesizer module 326 are not necessarily all on the same computing device 200. In one embodiment, the modules 332 and 334 and/or their functionality are distributed across multiple computing devices 200. For example, in one embodiment, the modules 332, 334 are distributed across multiple servers 122. It should also be recognized that the module 332 and 334 need not be separate modules and that the division of features and functionality among the components 109, 130 and modules 322, 324, 326, 328, 332 and 334 is merely an example and other examples exist. For example, in one embodiment the components of the predicate tool 109 may be included in the query optimizer 130.

The missing predicate synthesis module 332 generates a synthesized predicate for a predicate that is missing. For example, in Example Query 1 (i.e. Select * from Customer where SalesRep='Scott' AND Balance=5000;), predicates for "CreditHold" and "Custnum" are missing, since the Table "Customer" has a local index "CustIdx1" on columns "CreditHold," "SalesRep," "Balance," and "Custnum," and the missing predicate synthesis module 332 generates a synthesized predicate for list partition key column "CreditHold".

Synthesizing predicates on missing partition key columns enables the query optimizer 130 and runtime to construct a better index scan search expressions because a greater number of partition key columns will have predicates. For example, consider the same table and index example. Consider the query:
Select * from Customer where SalesRep='BBB' and Balance>15000 and Custnum=100;

For this query, the missing predicate synthesis module 332 generates a synthesized predicate on missing the partition column, that is, CreditHold IN (<SynthValue(s)>). In one embodiment, one or more values for "<SynthValue(s)>" are set by the query optimizer 130 during the execution, or runtime, (while iterating over the partition definitions).

The index probing predicate synthesis module 334 generates a synthesized predicate when the query includes a predicate that is unusable for index probing (without using a synthesized predicate). As described above, a predicate may be unusable for index probing when the predicate itself is unusable (e.g. the predicate is associated with an operator, such as "< >" (NOT EQ) that is unusable for index probing) or the predicate makes subsequent or following predicates unusable (e.g. when a leading key is associated with a range, subsequent keys are unusable for index probing).

In one embodiment, the index probing predicate synthesis module 334 generates a synthesized predicate that enables the selection mechanism of a query optimizer 130 to select a table partition (TP) local index scan even if the leading (or middle) components of the index are range predicates or if they contain operators which cannot be used for index scan. Please consider the following example queries, which still refer to the same example table and index.

Example Query A:
Select * from Customer where CreditHold < > 0 and SalesRep='BBB' and Balance=1000 and Custnum=100;

For Example Query A, without a synthesized predicate, a table scan would be selected by the query optimizer 130 because the predicate on leading index component (i.e., CreditHold) has an operator < > (NOT EQ) which cannot be used for index probing.

Example Query B:
Select * from Customer where CreditHold >0 and SalesRep < > 'BBB' and Balance=1000 and Custnum=100;

For Example Query B, without a synthesized predicate, index scan can be chosen, where index probing is based on only first index component (i.e. CreditHold). Other predicates (i.e. SalesRep, Balance and Custnum), without a synthesized predicate, are ignored, as first component has a range predicate (">").

However, the index probing predicate synthesis module 334 generates one or more synthesized predicates. For example, with regard to Example Query A, the index probing predicate synthesis module 334 generates synthesized predicates so that an index scan using all four index components is used instead of using table scan. Similarly, in another example, with regard to Example Query B, the index probing predicate synthesis module 334 generates synthesized predicates so that an index scan using all four index components is used instead of using only one index component.

In one embodiment, the index probing predicate synthesis module 334 synthesizes predicates on the partition key columns of the LIST type where the user given predicates for the partition key columns cannot be used for index probing. With this done, query optimizer 130 is exposed to a larger number of usable index predicates and can consider better query plans.

In one embodiment, the predicate synthesizer module 326 (or one or more components thereof 332, 334) passes the one or more synthesized predicates to the predicate output module 328. In one embodiment, the predicate synthesizer module 326 (or one or more components thereof 332, 334) stores the one or more synthesized predicates in memory 204 (or any other non-transitory storage medium communicatively accessible). The other modules of the predicate tool 109 including, e.g., the predicate output module 328, may retrieve the one or more synthesized predicates by accessing the memory 204 (or other non-transitory storage medium).

The predicate output module 328 provides the predicates to the query optimizer 130 for use. For example, the predicate output module 328 provides any synthesized predicates generated to supplement or replace the predicates of the query and any predicates of the query that were not replaced to the query optimizer 130 for use.

In one embodiment, the predicate output module 328 passes the predicates to the query optimizer 130. In one embodiment, the predicate output module 328 stores the predicates in memory 204 (or any other non-transitory storage medium communicatively accessible). The other components of the system 100 including, e.g., the query optimizer 130, may retrieve the predicates by accessing the memory 204 (or other non-transitory storage medium).

In one embodiment, a predicate output module 328 is omitted and the predicate synthesizer module 326 (or one or more components thereof 332, 334) passes the one or more synthesized predicates to the query optimizer 130. In one embodiment, the predicate synthesizer module 326 (or one or more components thereof 332, 334) stores the one or more synthesized predicates in memory 204 (or any other non-transitory storage medium communicatively accessible) and the query optimizer 130 may retrieve the one or more synthesized predicates by accessing the memory 204 (or other non-transitory storage medium).

The query optimizer 130 optimizes the query. In one embodiment, the query optimizer optimizes the query using an index scan and one or more synthesized predicates. For example, consider the same table and index and consider the query:
Select * from Customer where SalesRep='BBB' and Balance>15000 and Custnum=100;

For this query, a predicate is missing and the missing predicate synthesis module 332 generates a synthesized predicate on missing the partition column, that is, CreditHold IN (<SynthValue(s)>). In one embodiment, one or more values for "<SynthValue(s)>" are set during the execution (while iterating over the partition definitions). Note that, for partition key column CreditHold (which is LIST partition key) all rows in a partition contains only a set of defined values. Hence, while iterating over partition definitions, the query optimizer 130 obtains the defined values of column CreditHold from the partition definition and substitutes. The advantage of doing this is that, the query optimizer is able to consider an index scan, though the query does not contain predicates on the leading components of the index. This advantage is visible for the above query when leading component CreditHold predicate is synthesized.

Another advantage of this is that, the index can use more components than specified. For example, consider the query:
Select * from Customer where CreditHold=0 and Balance=15000 and Custnum>100;

Without a synthesized predicate, index scan is chosen with only component CreditHold=0 as an index predicate. However, in one embodiment, the use of a synthesized predicate on the SalesRep column, by the query optimizer 130, results in an index scan with all 4 components, which will be more efficient. Furthermore, synthesizing predicates is possible for more than one partition key column which are of the type LIST. For example, consider the query:
Select * from Customer where Balance=15000 and Custnum>100;

In this example, the missing predicate synthesis module 332 generates synthesized predicates and the query optimizer 130 uses synthesized predicates on two partition key columns (i.e. CreditHold and SalesRep) resulting in selection of index scan with all 4 components of the index.

The preceding example refers to a missing predicate. Please consider the following illustrations with reference to Example Queries A and B, above, for examples regarding one or more predicates that are unusable for index probing.

Illustration for Example Query A:
Select * from Customer where CreditHold < > 0 and SalesRep='BBB' and Balance=1000 and Custnum=100;

Index probing predicate synthesis module 334 generates a synthesized predicate CreditHold IN <SynthValue(s)>, and the query optimizer 130 has the following predicates in hand to consider any index selection.

CreditHold !=0 and
CreditHold IN <SynthValue(s)> and
SalesRep='BBB' and
Balance=1000 and
Custnum=100

From the above predicate list, the query optimizer 130 uses index scan by choosing the following predicates as index predicates.

CreditHold IN <SynthValue(s)> and
SalesRep='BBB' and
Balance=1000 and
Custnum=100

The actual predicate (CreditHold < > 0) given by user is evaluated after the each index probe.

Illustration for Example Query B:
Select * from Customer where CreditHold >0 and SalesRep < > 'BBB' and Balance=1000 and Custnum=100;

Index probing predicate synthesis module 334 generates a synthesized predicate CreditHold IN <SynthValue(s)>, SalesRep IN <SynthValue(s)>, so the query optimizer 130 has the following predicates in hand to consider any index selection.

CreditHold >0 and
CreditHold IN <SynthValue(s)> and
SalesRep < > 'BBB' and
SalesRep IN <SynthValue(s)> and
Balance=1000 and
Custnum=100

From the above predicate list, the query optimizer 130 can use index scan by choosing the following predicates as index predicates.

CreditHold IN <SynthValue(s)> and
SalesRep IN <SynthValue(s)> and
Balance=1000 and
Custnum=100

The actual predicates (CreditHold >0 AND SalesRep < > 'BBB') given by user be evaluated after the each index probe.

FIG. 7 illustrates a table of example predicates (e.g. included in a user's query) in a first column, corresponding outcomes without synthesized predicates, and corresponding outcomes with synthesized predicates. It should be recognized that with synthesized predicates an index scan is performed and the index scan uses a greater number of predicates.

Some of the benefits of synthesized predicates have already been mentioned. However, the synthesized predicates are further useful during joins and in the optimization of joins. Two tables can be joined using one of several techniques including:

Index join—uses an index to give fast access to only the data eligible for the join.

Nested loops—sequentially reads all the data for both tables in the join, and reads one of the tables multiple times. As discussed here, a Nested Loop join does not use an index to evaluate join predicates.

Merge join—re-orders the data to be joined in join key order, and joins rows from the 2 tables whose join keys match.

Usually, an index join with an existing index is considered to be best performing join, and nested loops is considered to be the worst performing join. Consider a table Order which has columns SalesRep, Balance, Custnum. Now, consider the below query which is essentially a join between Customer table and Order table.

Select * from Order O INNER JOIN Customer C on C.SalesRep=O.SalesRep and C.Balance=O.Balance and C.Custnum=O.Custnum;

In the above scenario, without a synthesized predicate, the produced Join would be Nested Loop (Both sides having table scan), because a predicate on prefix component (CreditHold) of index is not present in the query. When a synthesized predicate is generated on CreditHold, then the produced join can be Index Join, where right side of the join has Index Scan to evaluate the join condition, which is generally much faster than Nested Loop Join.

Oracle uses an "Index Skip Scan" when there is no predicate on the first component of an index so that index scan can be chosen. But it has following limitations.

a. First component of an index should have very few unique values.

b. There must be a predicate on the second column of the index. Skip Scan can only skip the first column, not two or more.

c. Skip Scan will not skip a second or subsequent index column, e.g. if there are predicates on the first and third columns, at best regular index scan on the first column is possible.

d. Index Skip Scan skips one level of B-Tree while searching for the index key.

By contrast, the predicate tool 109 and synthesized predicates described herein differs in many regards. For example, the predicate tool 109 may synthesize missing predicates on index key columns rather than merely skipping a missing first predicate. The predicate tool 109 has no restriction on a number of unique values for a column. The predicate tool 109 may synthesize a predicate for more than one index key component. The predicate tool 109 may synthesize predicates even in cases where user query contains a predicate on the index key components but they are not index usable (For example, column1 !=100 and column2 !=200 and column3=300, here predicates on column1 and column2 are synthesized if they are List partition key columns). The predicate tool further differs from the Index Skip Scan. That is, Index Skip Scan skips one level of B-Tree for implementation, whereas, proposed idea exposes more number of predicates than actual given predicates to SQL Optimizer, so that Optimizer can exercise more number of query plans. There is no change required in the way B-Tree search happens for a specific key.

Example Methods

Figure 4:
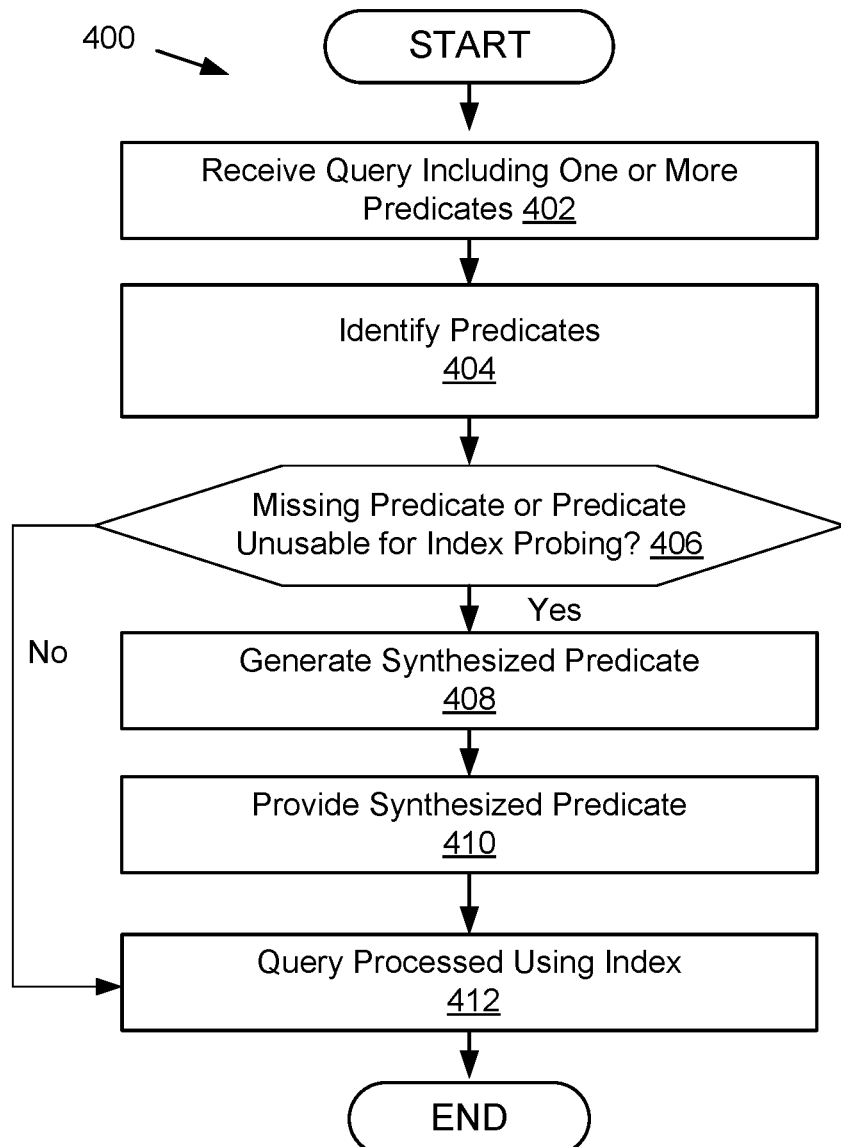
FIG. 4 is a flowchart of an example method for synthesizing a predicate to access data using an index according to one embodiment.

FIG. 4 depicts method 400 performed by the system described above in reference to FIGS. 1-3B according to one embodiment. The method 400 begins at block 402. At block 402, the query receiver module 322 receives a query including one or more predicates. For example, the query receiver module 322 receives a query on a partitioned table including one or more predicates. At block 404, the predicate identification module 324 identifies the one or more predicates. At block 406, the predicate synthesizer module 326 determines whether the query is missing a predicate and/or a predicate is unusable for index probing. At block 408, the predicate synthesizer module 326 generates the one or more synthesized predicates for the missing and/or unusable predicate(s). At block 410, the predicate output module 328 provides the synthesized predicates (e.g. to the query optimizer 130). At block 412, the query optimizer 130 utilizes the synthesized predicate to process the query (e.g. using a table partition local index scan).

Figure 5:
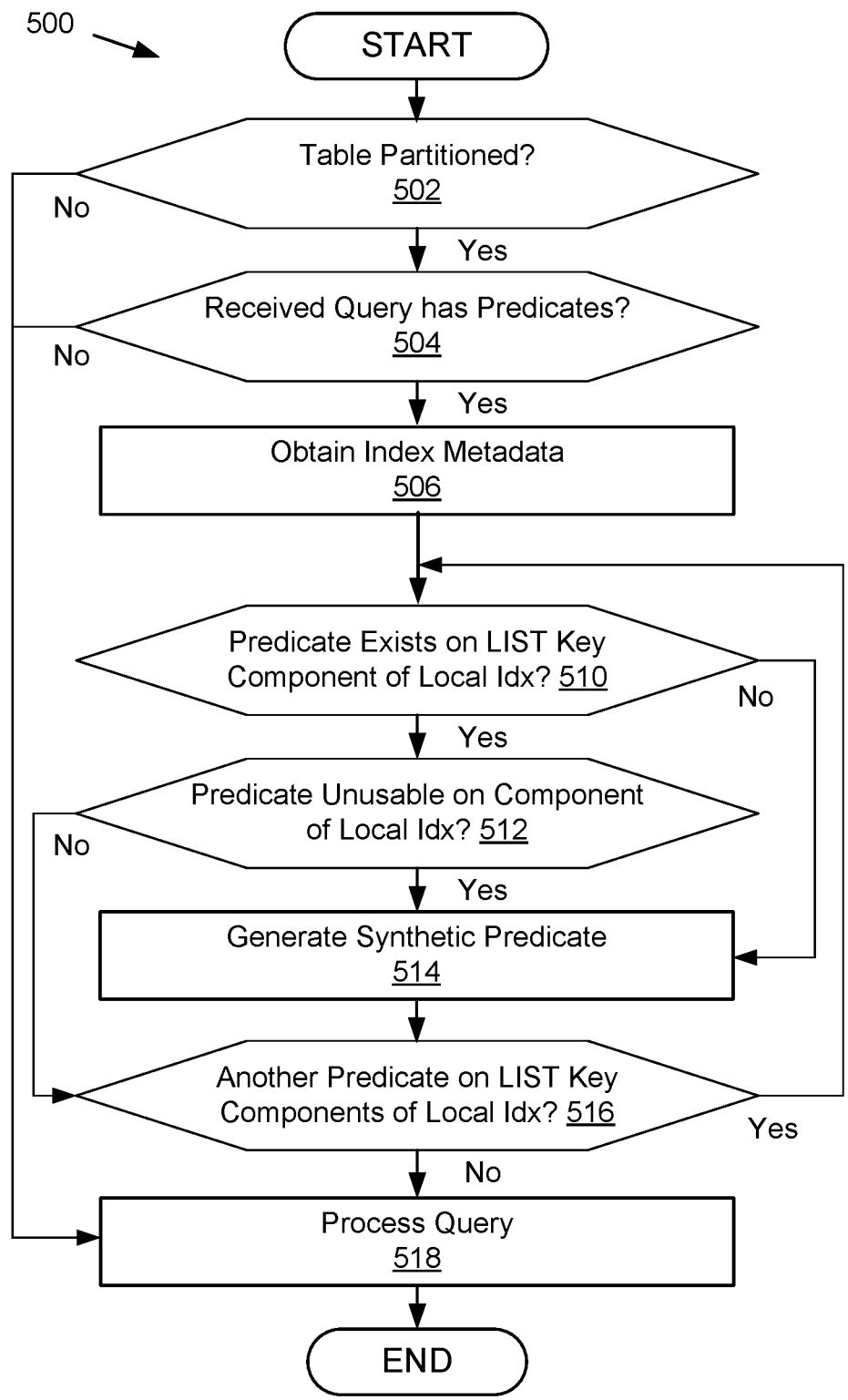
FIG. 5 is a flowchart of an example method for synthesizing a predicate to access data using an index according to another embodiment.

FIG. 5 depicts method 500 performed by the system described above in reference to FIGS. 1-3B according to one embodiment. The method 500 begins at block 502. At block 502, the predicate identification module 324 determines whether the table being queried is partitioned. When the predicate identification module 324 determines the table is not partitioned (502—No), the method 500 continues at block 518 and the query is processed (e.g. as a regular table). When the predicate identification module 324 determines that a table is partitioned (502—Yes), the method 500 continues at block 504.

At block 504, the predicate identification module 324 determines whether a request for a partitioned table schema has been received. When the predicate identification module 324 determines that a received query does not include one or more predicates (504—No), the method 500 continues at block 518 and the query is processed (e.g. as a regular table). When the predicate identification module 324 determines that a received query includes one or more predicates (504—Yes), the method 500 continues at block 506.

At block 506, the predicate identification module 324 obtains index metadata for the partitioned table being queried. At block 510, the predicate identification module 324 determines whether the query includes a predicate on a LIST key component of the local index. When the predicate identification module 324 determines that a predicate does not exist on a list component of the local index (i.e. is not included in the received query) (510—No), the method 500 continues at block 514 and the predicate synthesizer module 326 generates a synthesized predicate for the missing predicate. When the predicate identification module 324 determines the predicate does exist on a list component of the local index (i.e. is included in the received query) (510—Yes), the method 500 continues at block 512.

At block 512, the predicate identification module 324 determines whether the predicate is unusable for index probing. When the predicate identification module 324 determines that the predicate is usable for index probing (512—No), the method 500 continues at block 516. When the predicate identification module 324 determines that the predicate is unusable for index probing (512—Yes), the method 500 continues at block 514 and the predicate synthesizer module 326 generates a synthesized predicate for the unusable predicate before the method 500 continues at block 516.

At block 516, the predicate tool 109 determines whether there is another predicate on a LIST key component of the local index. When the predicate tool 109 determines that another predicate on a list key component exists (516—Yes), blocks 510-516 are repeated until each predicate on a LIST key component of the local index has been processed (i.e. 516—No). When the predicate tool 109 determines that another predicate on a list key component does not exist (516—No), the method 500 continues at block 518.

At block 518, the query optimizer 130 processes the query. For example, the query optimizer 130 adds the index including the one or more synthesized predicates as an eligible index candidate and compares the cost of indices and selects one.

Figure 6:
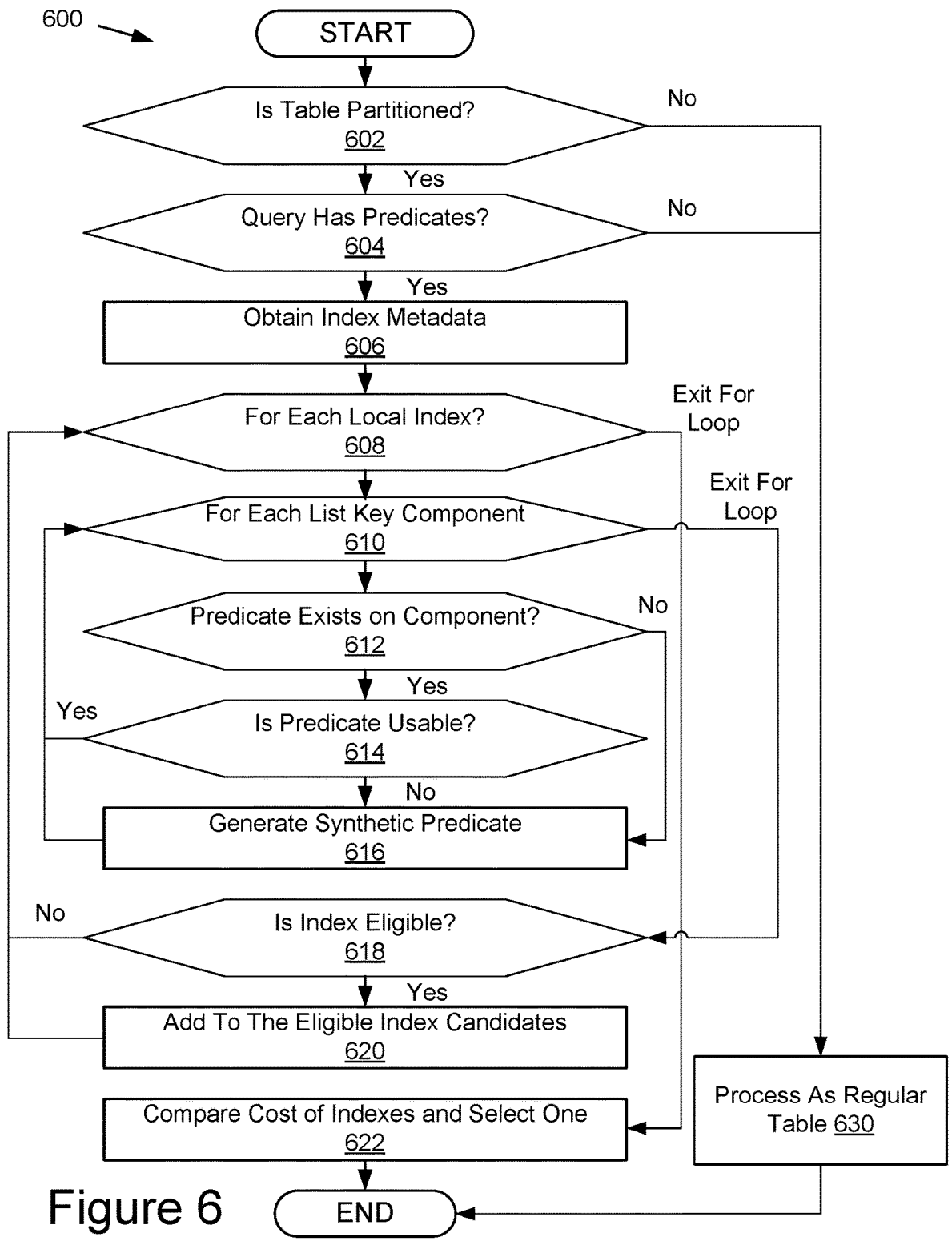
FIG. 6 is a flowchart of an example method for synthesizing a predicate to access data using an index according to yet another embodiment.

FIG. 6 depicts method 600 performed by the system described above in reference to FIGS. 1-3B according to one embodiment. The method 600 begins at block 602. At block 602, the predicate identification module 324 determines whether the table being queried is partitioned. When the predicate identification module 324 determines the table is not partitioned (602—No), the method 600 continues at block 630 and the query is processed (e.g. as a regular table). When the predicate identification module 324 determines that a table is partitioned (602—Yes), the method 600 continues at block 604.

At block 604, the predicate identification module 324 determines whether a request for a partitioned table schema has been received. When the predicate identification module 324 determines that a received query does not include one or more predicates (604—No), the method 600 continues at block 630 and the query is processed (e.g. as a regular table). When the predicate identification module 324 determines that a received query includes one or more predicates (604—Yes), the method 600 continues at block 606.

At block 606, the predicate identification module 324 obtains index metadata for the partitioned table being queried. Each available local index is looped through as is illustrated by blocks 608 and 618 and 620. Additionally, each list key component of an available index are looped through as indicated by blocks 610 and 616. For example, when a table has multiple local indices (e.g. Custidx1 is defined on columns CreditHold, SalesRep, Balance, Custnum and Custidx2 is defined on credithold, salesrep, balance, name), blocks 608 and 618 or 620 iterate through Custidx1 and Custidx2 and blocks 610 and 614 or 616 iterate over the index components (e.g. CreditHold, SalesRep, Balance, Custnum for Custidx1 and credithold, salesrep, balance, name for Custidx2).

At block 612, the predicate identification module 324 determines whether a predicate exists in the query on the list key component. When the predicate identification module 324 determines that a predicate does not exist on the list component of the local index (i.e. is not included in the received query) (612—No), the method 600 continues at block 616 and the predicate synthesizer module 326 generates a synthesized predicate for the missing predicate. When the predicate identification module 324 determines the predicate does exist on a list component of the local index (i.e. is included in the received query) (612—Yes), the method 600 continues at block 614.

At block 614, the predicate identification module 324 determines whether the predicate is usable for index probing. When the predicate identification module 324 determines that the predicate is usable for index probing (614—Yes), the method 600 continues at block 610 for the next list key component. When there are no further list key components, the method 600 continues at block 618. When the predicate identification module 324 determines that the predicate is unusable for index probing (614—No), the method 600 continues at block 616 and the predicate synthesizer module 326 generates a synthesized predicate for the unusable predicate before the method 600 continues at block 610 for the next list key component. When there are no further list key components, the method 600 continues at block 618.

At block 618, the query optimizer 130 determines whether the index is eligible for use. When the query optimizer 130 determines that the index is ineligible (618—No), the method 600 continues at block 608 for the next local index. If there are no further local indices, the For loop for block 608 ends and the method continues at block 622. When the query optimizer 130 determines that the index is eligible (618—Yes), the method 600 continues at block 620 where the query optimizer adds the index to the eligible index candidates and continues to block 608 for the next local index. If there are no further local indices, the For loop for block 608 ends and the method continues at block 622.

At block 622, the query optimizer 130 compares the costs of the indices and selects one for use.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   receiving, using one or more processors, a query querying a partitioned table;
   determining, using the one or more processors, that the query includes a first index predicate associated with a range and a second index predicate following the first index predicate; and
   responsive to determining that the query includes the first index predicate associated with the range and the second index predicate following the first index predicate, generating, using the one or more processors, a synthesized predicate corresponding to the first index predicate for the query, the synthesized predicate being used to process the query using an index scan.

2. The method of claim 1, wherein:
   the synthesized predicate is not a range predicate.

3. The method of claim 1, wherein:
   the synthesized predicate includes an operator usable for index probing.

4. The method of claim 1, wherein:
   the first index predicate is associated with a first partition key column of a list type in the partitioned table, the first partition key column containing a set of defined values in a partition of the partitioned table.

5. The method of claim 1, wherein:
   the first index predicate is associated with a first partition key column in the partitioned table; and
   generating the synthesized predicate corresponding to the first index predicate includes:
     obtaining one or more values in the first partition key column; and
     generating the synthesized predicate corresponding to the first index predicate using the one or more values in the first partition key column.

6. The method of claim 5, wherein:
   the synthesized predicate corresponding to the first index predicate includes an IN operator and a set of the one or more values in the first partition key column.

7. The method of claim 1, further comprising:
   generating a query plan based on the second index predicate and the synthesized predicate corresponding to the first index predicate; and
   executing the query plan to process the query using the index scan.

8. The method of claim 7, wherein:
   the index scan includes one or more index probes; and
   executing the query plan includes responsive to an index probe, evaluating retrieved data using the first index predicate.

9. The method of claim 7, wherein:
   the query includes a join condition associated with the partitioned table and another table; and
   executing the query plan includes performing the index scan on the partitioned table to evaluate the join condition.

10. The method of claim 1, further comprising:
    determining that the query includes a third index predicate associated with an operator unusable for index probing; and
    responsive to determining that the query includes the third index predicate associated with the operator unusable for index probing, generating another synthesized predicate corresponding to the third index predicate for the query, the another synthesized predicate being used to process the query using the index scan.

11. A system comprising:
    a processor; and
    a memory storing instructions that, when executed, cause the system to:
      receive a query querying a partitioned table;
      determine that the query includes a first index predicate associated with a range and a second index predicate following the first index predicate; and
      responsive to determining that the query includes the first index predicate associated with the range and the second index predicate following the first index predicate, generate a synthesized predicate corresponding to the first index predicate for the query, the synthesized predicate being used to process the query using an index scan.

12. The system of claim 11, wherein:
    the synthesized predicate is not a range predicate.

13. The system of claim 11, wherein:
    the synthesized predicate includes an operator usable for index probing.

14. The system of claim 11, wherein:
    the first index predicate is associated with a first partition key column of a list type in the partitioned table, the first partition key column containing a set of defined values in a partition of the partitioned table.

15. The system of claim 11, wherein:
    the first index predicate is associated with a first partition key column in the partitioned table; and
    generating the synthesized predicate corresponding to the first index predicate includes:
      obtaining one or more values in the first partition key column; and
      generating the synthesized predicate corresponding to the first index predicate using the one or more values in the first partition key column.

16. The system of claim 15, wherein:
    the synthesized predicate corresponding to the first index predicate includes an IN operator and a set of the one or more values in the first partition key column.

17. The system of claim 11, wherein the instructions, when executed, cause the system to:
- generate a query plan based on the second index predicate and the synthesized predicate corresponding to the first index predicate; and
- execute the query plan to process the query using the index scan.

18. The system of claim 17, wherein:
the index scan includes one or more index probes; and
executing the query plan includes responsive to an index probe, evaluating retrieved data using the first index predicate.

19. The system of claim 17, wherein:
the query includes a join condition associated with the partitioned table and another table; and
executing the query plan includes performing the index scan on the partitioned table to evaluate the join condition.

20. The system of claim 11, wherein the instructions, when executed, cause the system to:
- determine that the query includes a third index predicate associated with an operator unusable for index probing; and
- responsive to determining that the query includes the third index predicate associated with the operator unusable for index probing, generate another synthesized predicate corresponding to the third index predicate for the query, the another synthesized predicate being used to process the query using the index scan.

* * * * *